(12) United States Patent
Sekhar

(10) Patent No.: US 7,822,000 B2  
(45) Date of Patent: Oct. 26, 2010

(54) TIME DIVISION MULTIPLEXING FOR ACCESS PORTS IN A WIRELESS NETWORK

(75) Inventor: Ramesh Sekhar, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 1257 days.

(21) Appl. No.: 11/171,512

(22) Filed: Jun. 30, 2005

(65) Prior Publication Data

US 2007/0002889 A1    Jan. 4, 2007

(51) Int. Cl.  
 *H04B 7/212* (2006.01)

(52) U.S. Cl. ............ 370/337; 370/328; 370/338; 455/403; 455/502; 455/525

(58) Field of Classification Search ............ 370/337, 370/328, 338; 455/403, 502, 525  
See application file for complete search history.

(56) References Cited

U.S. PATENT DOCUMENTS

| | | | | |
|---|---|---|---|---|
| 5,940,381 A * | 8/1999 | Freeburg et al. | ............ | 370/331 |
| 5,959,983 A * | 9/1999 | Saito et al. | ............ | 370/337 |
| 6,958,991 B1 * | 10/2005 | Raaf | ............ | 370/348 |
| 6,982,971 B2 * | 1/2006 | Tiedemann et al. | ............ | 370/333 |
| 7,151,945 B2 * | 12/2006 | Myles et al. | ............ | 455/502 |
| 7,308,285 B2 * | 12/2007 | Nelson et al. | ............ | 455/562.1 |
| 2003/0236103 A1 | 12/2003 | Tamaki et al. | | |
| 2004/0057398 A1 | 3/2004 | Black | | |
| 2004/0229621 A1 | 11/2004 | Misra | | |
| 2004/0259558 A1 | 12/2004 | Skafidas et al. | | |

FOREIGN PATENT DOCUMENTS

| | | |
|---|---|---|
| EP | 1418779 A2 | 5/2004 |
| WO | 2005008938 A2 | 1/2005 |

OTHER PUBLICATIONS

International Search Report for International Application No. PCT/US2006/025772, mailed Nov. 11, 2006.

* cited by examiner

*Primary Examiner*—Nghi H Ly

(57) ABSTRACT

A method for allowing time multiplexing in a wireless network comprising two or more access port and a wireless switch includes receiving a time ordered sequence comprising a plurality of time slots from the wireless switch. Next, the signals are transmitted according to the time ordered sequence. In another embodiment, an access port used in a wireless network that includes a wireless switch comprises a transceiver operable to receive a time ordered sequence comprising a plurality of time slots calculated by the wireless switch. Further the access port comprises a plurality of antennas coupled to an antenna selector; the antenna selector configured to couple selectively the transceiver with at least one of the plurality of antennas based at least in part on the time ordered sequence.

6 Claims, 4 Drawing Sheets

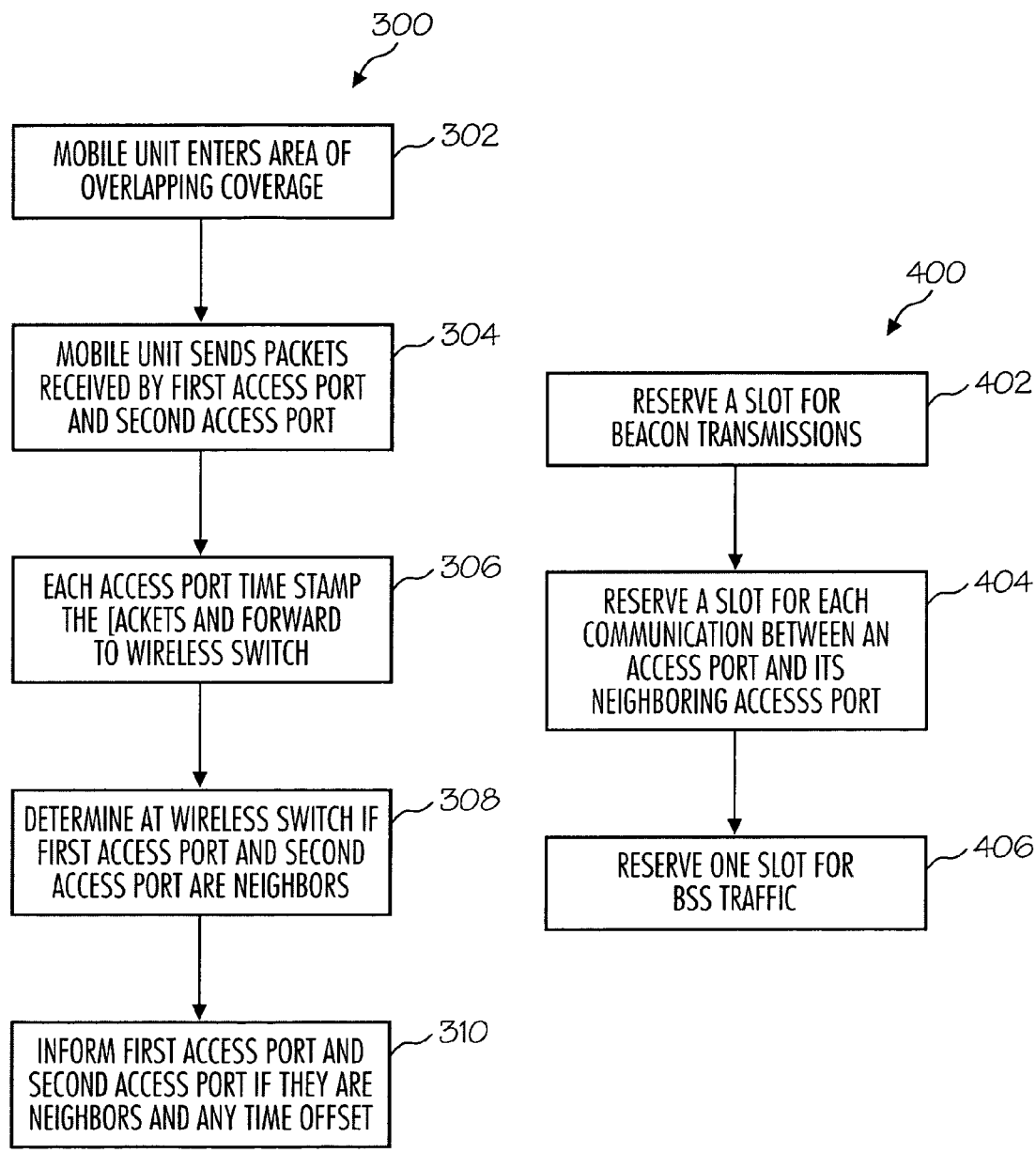

TIME DIVISION MULTIPLEXING FOR ACCESS PORTS IN A WIRELESS NETWORK

TECHNICAL FIELD OF THE INVENTION

This invention relates to the field of wireless networking and, more specifically, to a time division multiplexing for access ports in a wireless network.

BACKGROUND OF THE INVENTION

In today's work environment, mobile connectivity is becoming increasingly important. The ability to send and receive data anywhere within an office, school, factory, or other location is quickly becoming a necessity, and wireless local area networks have been introduced to facilitate such mobile connectivity. Generally, a wireless local area network includes access ports that are directly connected to wired networks, such as an Ethernet network. In this approach, maintaining configuration data, performing client authentication and performing other tasks are conducted at the access port. However, such an approach has numerous deficiencies and drawbacks, including elevated costs for network management and maintenance.

To alleviate some of these deficiencies and drawbacks, a wireless network based on an intelligent wireless switch has been developed. In this type of wireless network, access ports are coupled with a wireless switch that contains the intelligence to maintain configuration data, perform client authentication and perform other tasks while the access ports provide only wireless access. This configuration has numerous benefits, including ease of management, cost efficiency, and flexibility.

A potential problem in wireless local area networks having wireless switches and wireless local area networks that includes wired and wireless access ports is the possibility of two or more transmitting access ports interfering with each other. One source of interference can occur when a radiation pattern produced by an access port's omni-directional antenna interferes with the radiation pattern emitted from another nearby access port. The two radiation patterns may destructively interfere with each other resulting in a potential loss of signal. To reduce some of the interference from access ports with omni-directional antennas, access ports with multiple directional antennas have been eproposed. These access ports can choose the antenna to use and send data along a focused antenna pattern. However, interference can still occur in busy wireless networks when simultaneously transmitting access ports interfere with each other. Also, if an access port sends out an omni-directional beacon signal at the same time other access ports are transmitting signals, interference can occur.

Accordingly, it is desirable to provide a wireless network system with wireless access ports that substantially eliminates or eliminates interference from overlapping signals. In addition it is desirably to provide methods for sending signals in a wireless network that substantially eliminates or eliminates interference from overlapping signals. Furthermore, other desirable factors and characteristics of the present invention will become apparent from the subsequent detailed description and the appended claims, taken in conjunction with the accompanying drawings, technical field, and background.

BRIEF DESCRIPTION OF THE DRAWINGS

The present invention will hereinafter be described in conjunction with the following drawing figures, wherein like numerals denote like elements, and:

FIG. 3 is a flowchart for determining neighboring access ports and relative time offsets between access ports in accordance with an exemplary embodiment of the present invention;

FIG. 4 is a flowchart for a method of assigning time slots for an access port in accordance with the teachings of the present invention.

SUMMARY OF THE INVENTION

In one embodiment of the present invention, a method for sending signals in a wireless network comprising two or more access port and a wireless switch is disclosed. As a first step, a time ordered sequence comprising a plurality of time slots is received from the wireless switch. Then the signals are transmitted according to the time ordered sequence.

In another embodiment, an access port used in a wireless network that includes a wireless switch is disclosed. The access port comprises a transceiver operable to receive a time ordered sequence comprising a plurality of time slots calculated by the wireless switch. Further the access port comprises a plurality of antennas coupled to an antenna selector; the antenna selector configured to couple selectively the transceiver with at least one of the plurality of antennas based at least in part on the time ordered sequence.

In yet another embodiment, a wireless network is disclosed. The wireless network comprises a wireless switch and a plurality of access ports. The wireless switch is operable to determine a time ordered sequence for each of the plurality of access ports. The plurality of access ports are each coupled to the wireless switch. Each of the plurality of access port comprises a transceiver operable to receive a time ordered sequence determined by the wired switch. Further, the access port comprises a plurality of antennas and an antenna selector coupled between the transceiver and each of the plurality of antennas. The selector is configured to couple the transceiver with at least one of the plurality of antennas based at least in part on the time ordered sequence.

DETAILED DESCRIPTION OF THE DRAWINGS

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
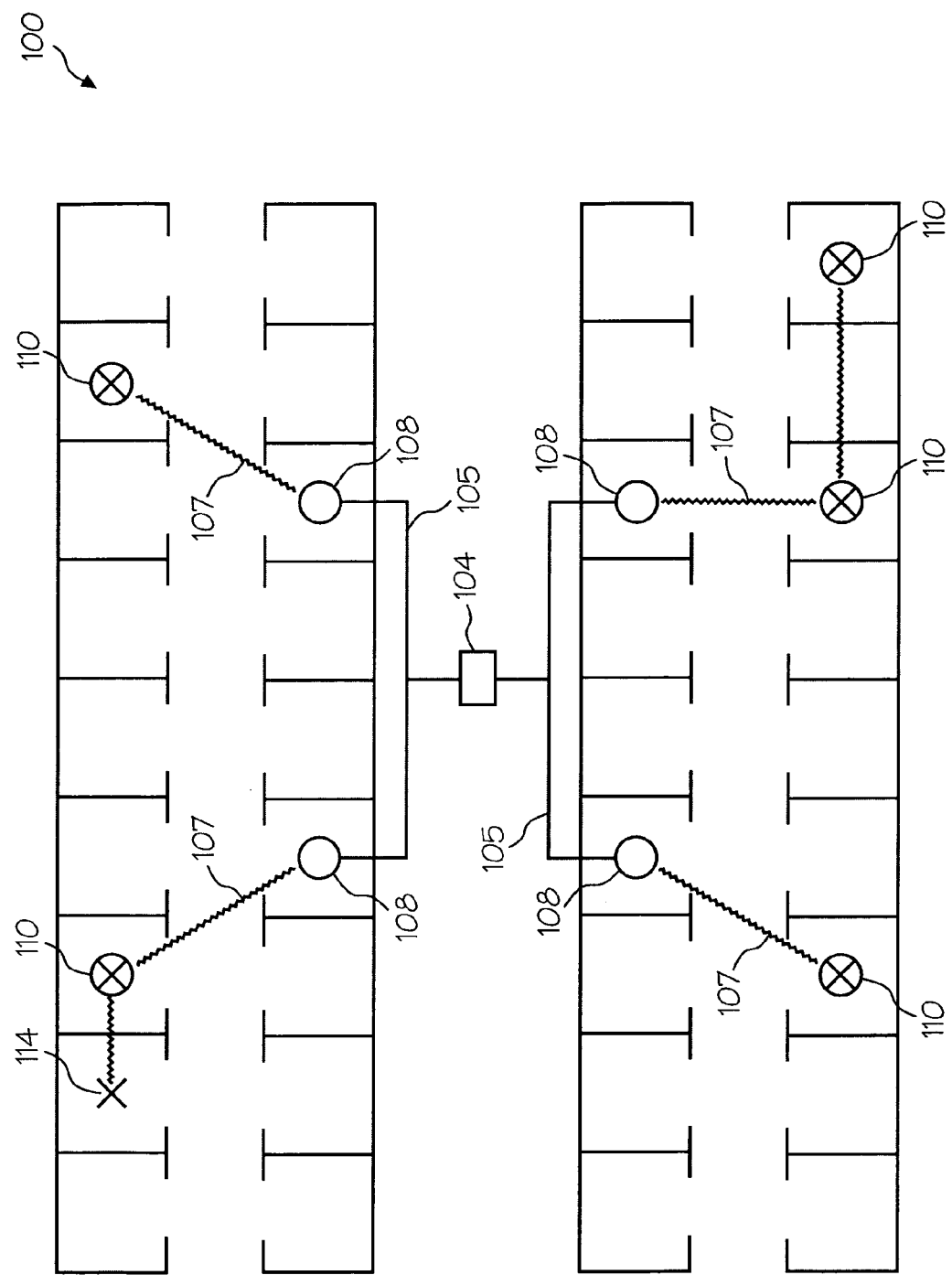
FIG. 1 illustrates a wireless network in accordance with an exemplary embodiment in accordance with the teachings of the present invention.

FIG. 1 illustrates an exemplary wireless local area network 100 distributed throughout a floor of a building, facility or other location. The wireless local area network 100 includes a wireless switch 104 coupled to wired access ports 108. The wireless local area network also includes wireless access ports 110 that are configured to communicate with the wired access ports 108. The wireless local area network 100 further includes mobile units 114 that can communicate between each other as well as with other devices in the wireless local area network 100 and with devices outside the local area network 100.

Wireless switch 104 is configured to provide centralized management and intelligence for the wireless local area network 100. The wireless switch 104 can determine optimal routing paths for data transfer in the wireless local area network 100 and provide the routing information to the wired access port 108 and the wireless access port 110. Wireless switch 104 is also configured to distribute software and software updates to the wired access ports 108 and the wired access ports 108 can send the software and software updates to the wireless access ports 110. In one embodiment wireless switch 104 couples the wireless local area network 100 to an external network such as the Internet.

Wired access ports 108 connect to the wireless switch 104 via a wired connection 105 that provides data transfer between the wired access ports 108 and the wireless switch 104. Additionally, the wired connection 105 can supply power to the wired access ports 108. Wired access ports 108 are further configured to send and receive data from mobile units 114 and wireless access ports 110. Routing information for the wired access port 108 can be determined, at least in part, at the wireless switch 104.

Wireless access ports 110 are configured to communicate with mobile units 114 and wired access ports 108 over a wireless link 107. The wireless access ports 110 utilize routing information provided by the wireless switch 104 to help determine where to send data. Unlike the wired access ports 108, the wireless access ports 110 are not connected to the wireless switch 104 via the wired connection 105 and communicate with the wireless switch 104 via the wired access ports 108.

Figure 2:
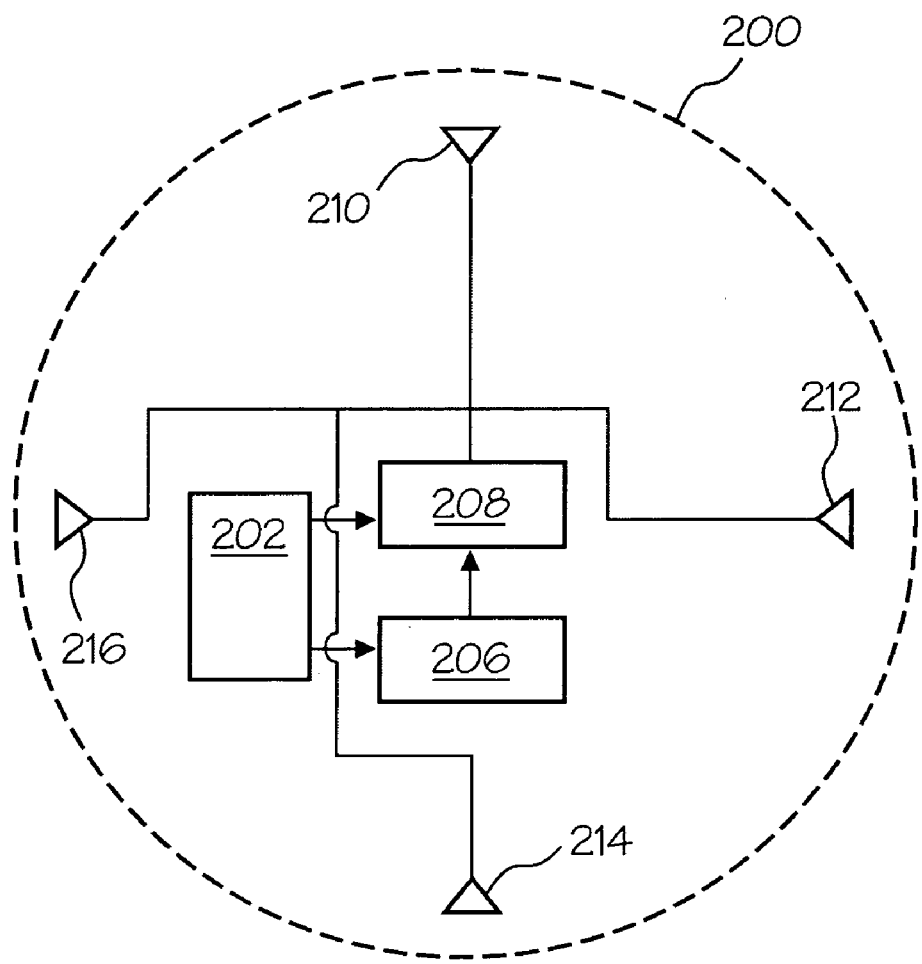
FIG. 2 illustrates an access port in accordance with an exemplary embodiment in accordance with the teachings of the present invention.

An access port 200 is illustrated in FIG. 2 in accordance with an exemplary embodiment of the invention. The access port 200 illustrated in FIG. 2 is a wireless access port, although access port 200 can also be a wired access port. A wired transceiver (not shown) would be provided if access port 200 was a wired access port in order to enable communication between the access port 200 and the wireless switch 104. Access port 200 comprises a processor 202 coupled to a transceiver 206. Antennas 210-216 couple to the transceiver 206 and processor 202 via an antenna selector 208.

Transceiver 206 is configured to send and receive transmissions to and from wireless access ports 110, wired access ports 108, and mobile units 114. While FIG. 2 illustrates a combined transceiver 206, separate receiver and transmitter units can also be used in accordance with the present invention.

Processor 202 is configured to execute various programs needed for the operation of the access port 200. For example, processor 202 can be configured to determine the proper antenna(s) 210-216 to use for a transmission.

Antennas 210-216 receive and transmit signals within a given region. In one exemplary embodiment, antennas 210-216 are directional antennas whose radiation patterns are in the form of lobes that extend outward from each of the antenna(s) 210-216 in one direction for a given antenna 210-216 position. By placing the antennas 210-216 around the access port in approximately an evenly spaced pattern, each of the antennas 210-216 covers a certain portion of a 360 degree arc around the access port 200. In the exemplary embodiment illustrated in FIG. 2, each of the four antennas 210-216 are evenly spaced and transmit and receive data within each of the four antennas' ninety degree area of coverage. While four antennas are shown in FIG. 2, the exact number of antennas can vary depending upon the area of coverage desired for each antenna 210-216.

Antenna selector 208 is configured to couple the transceiver 206 with one or more of the antennas 210-216 that allows the transceiver 206 to send a signal over any combination of the antennas 210-216. In one exemplary embodiment, processor 202 can determine the antennas 210-216 to use and can control the antenna selector 208 to select the proper antenna(s). The selection of the proper antenna(s) can be based, at least on part, on routing information supplied by the wireless switch 104. While processor 202 and antenna selector 208 are illustrated as separate elements, the two components can be formed as a single integrated component. In one exemplary embodiment, antenna selector 208 can be implemented as a Field-Programmable Gate Array (FPGA).

To alleviate the possibility of interference from antenna emissions from omni-directional antennas, in one exemplary embodiment of the present invention, a plurality of directional antennas 210-216 can be provided for the access port 200. The access port 200 includes four directional antennas 210-216 coupled to the common transceiver 206. The number of directional antennas 210-216 can be varied within the scope of the present invention. Antenna selector 208 can selectively couple the transceiver 206 to one or more of the antennas 210-216 for transmitting a signal, the choice depending, at least in part, upon the location of the destination access port or mobile unit. Alternatively, all four directional antennas 210-216 can be used simultaneously to send a signal that can be used to indicate the access port's proximity to the mobile units, known, as a broadcast transmission or beacon signal.

As discussed previously, although access ports with multi-directional antennas can help to alleviate interference in local area networks, there are situations, such as when two adjacent access ports send a beacon signal, where the possibility of interference still exists. To reduce the possibility of interference between access ports in such situations, the ability of each access port to transmit can be controlled. In one exemplary embodiment, for each access port, an amount of time is divided into individual time slots and each time slot is allocated to a type of transmission. By coordinating the time slot in which an access port sends information, interference between nearby access ports can be avoided. In one embodiment of the present invention, the wireless switch 104 determines the number of time slots and allocates the time slots to the access port 200.

Before the wireless switch 104 can assign time slots, the neighboring access ports for each access port are determined and the number of time slots needed for each access port is determined. FIG. 3 is a flowchart of an exemplary method 300 to determine the neighboring access ports to each access port. In the exemplary method, the access ports have an area of common overlap where they can receive the same signal but do not know where other access ports are located.

In a first step of the method, step 302, mobile unit 114 enters an area of overlap coverage between two access ports; a first access port and a second access port. Next, in step 304, the mobile unit 114 sends a packet to the first access port which is also received by the second access port, because, as mentioned earlier first access port and second access port have an overlapping reception area.

In step 306, each access port will time stamp the packet upon reception with the current time and then forward the packet to its final destination, which is, in this exemplary embodiment, wireless switch 104. In step 308, the wireless switch 104 receives the packets from each of the access ports and, in an exemplary embodiment, examines the header of each packet to determine if one of the packets received by one of the access ports passed through the other access port on the way to the wireless switch. If so, the access ports are considering neighboring access ports. As an example, if the packet received by the wireless switch 104 from the second access port passed through the first access port on its route to the wireless switch 104, the first and second access ports would be considered neighboring access ports.

Once access ports are considered neighbors, the wireless switch 104 can inform the access ports about any relative clock differences between the first access port and the second access port for synchronization purposes, in step 310. This can be done by comparing the time stamp of each packet. This method can then be repeated for each of the access ports in the network. The wireless switch 104 can then store the information about each access port in the local area network and their neighboring access ports.

Once the neighbors for each access port are determined, a time ordered sequence comprising a plurality of time slots can be assigned for each access port. The time slots in the time ordered sequence represent an amount of time that the access port can use to complete the task specified to be completed in that time slot. FIG. 4 is a flowchart of an exemplary method 400 for determining the number of time slots needed for an access port. In an exemplary embodiment, the steps of the method can be performed by the wireless switch 104. In a first step, step 402, one time slot is reserved for sending beacon signals from the access port. As discussed previously beacon signals are omni-directional signals sent to notify other access ports that the access port sending the beacon is in the network. Next, in step 404, a time slot is reserved for communications between the access port and each neighboring access port. For example, if the access port has four neighbors, four time slots need to be reserved. Next, in step 406, a time slot is allocated for the transfer of data to mobile units, which is also known as basic service set (BSS) data transfer. The time slots do not have to be equally long as some transmission may take a longer time than others. Also, individual slots can be further divided into a number of sub-slots. For example, the slot reserved for BSS data transfer could have sub-slots corresponding to each antenna such that during the BSS slot, the access port can transmit to mobile units using one of the antennas, and a second time slot, such that the access port can transmit to another mobile unit using another one of the antennas.

Figure 5:
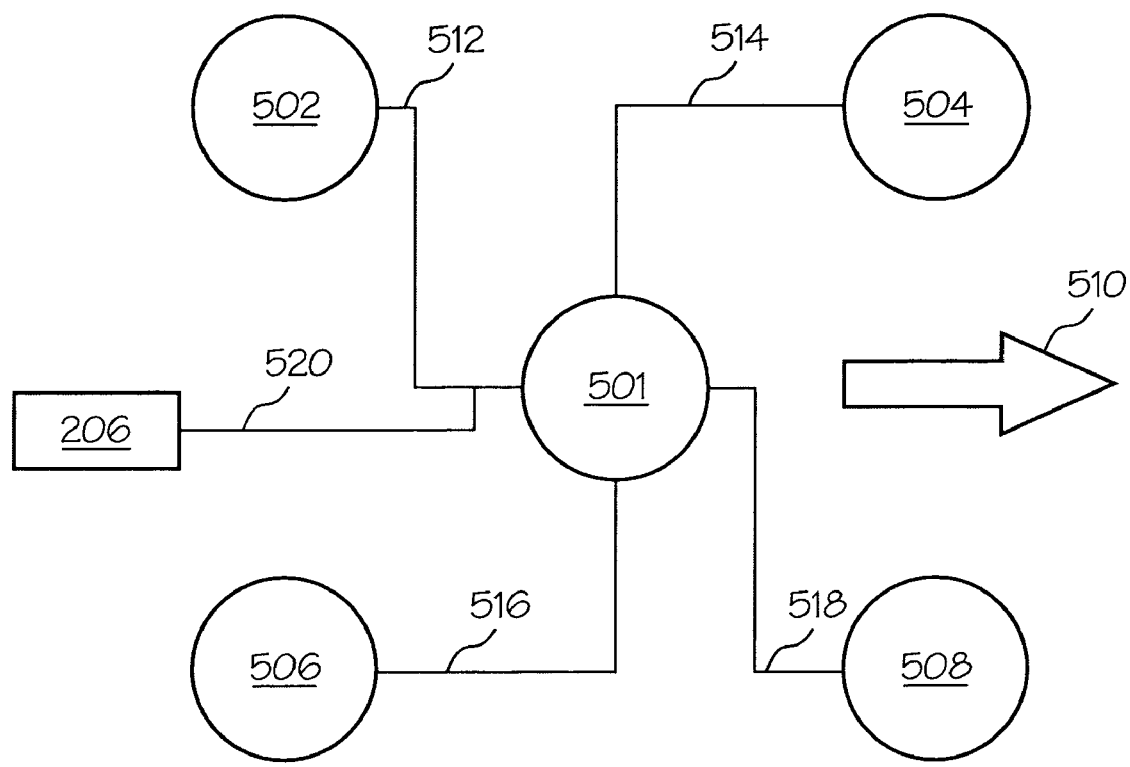
FIG. 5 illustrates an exemplary network illustrating the transmission in time slots in accordance with the teachings of the present invention.

FIG. 5 illustrates an exemplary network 500 with a first access port 501 and its neighbors. The first access port 501 has four neighbors; second access port 502, third access port 504, fourth access port 506, and fifth access port 508. One time slot is allocated for any beacon transmissions 510 from first access port 501. As noted before, beacons transmissions are transmissions used by access ports to identify themselves. Next, four slots are set aside for inter-access port traffic. That is, there will be one slot for a first communication 512 between first access port 501 and second access port 502, one slot for a second communication 514 between first access port 501 and third access port 504, one slot for a third communication 516 between first access port 501 and fourth access port 506, and one slot for a fourth communication 518 between first access port 501 and fifth access port 508. Then, a final slot, slot 520, is set for communication to mobile units (also known as base station traffic). Of course, the order of the time slots can be altered such that neighboring access ports do not send beacon signals at the same time.

This process can be repeated for each access port. While the procedure determines the number of slots needed per access port, the wireless switch still must determine which slot can be used for which transmission for each access port. In one example, the wireless switch must determine when the first access port 501 and the second access port 502 can send a beacon signal. If first access port 501 and second access port 502 of FIG. 5 both send a beacon in a first time slot there is likelihood for interference that could result from two close access ports sending an omni-directional signal at the same time. Therefore, the wireless switch could stagger the time slots such that first access port 501 and second access port 502 send beacon signals in different time slots. For example, the first access port 501 may be allowed to transmit a beacon signal in a first time slot and the second access port 502 allowed to transmit a beacon signal in a later time slot, such as a fourth time slot.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for sending data in a wireless local area network comprising a plurality of access ports and a wireless switch, the method comprising:

determining neighboring access ports for a first access port of the plurality of access ports from the wireless switch;

determining a time ordered sequence for the first access port based on the neighboring access ports from the wireless switch, the time ordered sequence representing an amount of time the first access port is to complete a task; and transmitting the data from the first access port according to the determined time ordered sequence, wherein the step of determining a time ordered sequence further comprises:

dividing the time ordered sequence into a plurality of time slots;

allocating a first set of time slots of the plurality of time slots for each communication between the first access port and all neighboring access ports;

allocating a second set of time slots of the plurality of time slots for broadcast transmissions; and allocating a third set of time slot of the plurality of time slots for communication between the first access port and a mobile unit.

2. The method of claim 1, wherein determining neighboring access ports further comprises:

receiving a data packet at the wireless switch that was received by the first access port and a second access port of the plurality of access ports;

determining if the first access port and the second access port are neighboring access ports; and determining a time offset between the first access port and the second access port to synchronize the first access port and the second access port if the first access port and the second access port are neighboring access ports.

3. The method of claim 2 wherein the step of determining if the first access port and the second access port are neighboring access ports further comprises determining if the first access port and the second access port are neighboring access ports if the first access port routes the data packet through the second access port or the second access port routes the data packet through the first access port.

4. The method of claim 3 wherein the step of determining a time offset further comprises computing the difference of a first timestamp indicating the time of the packet reception at the first access port and a second timestamp indicating the time of the packet reception at the second access port.

5. The method of claim 2 further comprising allocating the time slots of the time ordered sequence for the first access port based at least in part on the time offset between the first access port and the second access port.

6. The method of claim 5 wherein the step of allocating the time slots further comprises:
   allocating for the first access port a first time slot of the time ordered sequence for sending a broadcast transmission; and
   allocating for the second access port a second time slot of the time ordered sequence for sending a broadcast transmission, the first time slot and the second time slot selected as to provide a temporal separation between the broadcast transmissions to prevent interference.

* * * * *

UNITED STATES PATENT AND TRADEMARK OFFICE
CERTIFICATE OF CORRECTION

PATENT NO. : 7,822,000 B2  Page 1 of 1
APPLICATION NO. : 11/171512
DATED : October 26, 2010
INVENTOR(S) : Sekhar It is certified that error appears in the above-identified patent and that said Letters Patent is hereby corrected as shown below:

ON THE TITLE PAGE:

1. On the Title Page, in Item (56), under "U.S. PATENT DOCUMENTS", in Column 2, insert
-- 20020164963   A1   11/2002   Tehrani et al. --.

2. On the Title Page, in Item (56), under "U.S. PATENT DOCUMENTS", in Column 2, insert
-- 20030002471   A1   1/2003   Crawfod et al. --.

IN THE DRAWINGS:

3. In Fig. 3, Sheet 3 of 4, for Tag "306", in Line 2, delete "[ACKETS" and insert -- PACKETS --, therefor.

4. In Fig. 3, Sheet 3 of 4, for Tag "404", in Line 4, delete "ACCESSS" and insert -- ACCESS --, therefor.

5. In Column 1, Line 50, delete "eproposed." and insert -- proposed. --, therefor.

6. In Column 2, Line 8, delete "drawing figures," and insert -- figures, --, therefor.

Signed and Sealed this
Twenty-second Day of November, 2011

David J. Kappos
*Director of the United States Patent and Trademark Office*